US007368283B1

(12) United States Patent
Ito et al.

(10) Patent No.: US 7,368,283 B1
(45) Date of Patent: May 6, 2008

(54) AGITATION TANK FOR STORING BEER YEAST SLURRY

(75) Inventors: Hisayoshi Ito, Kakogawa (JP);
Yukimichi Okamoto, Kobe (JP);
Kimito Kawamura, Sapporo (JP);
Eiichi Jimbo, Kitasoma-gun (JP)

(73) Assignees: Kobelco Eco-Solutions Co. Ltd., Kobe (JP); Asahi Breweries, Ltd., Tokyo (JP)

( * ) Notice: Subject to any disclaimer, the term of this patent is extended or adjusted under 35 U.S.C. 154(b) by 0 days.

(21) Appl. No.: 09/926,146

(22) PCT Filed: Mar. 10, 2000

(86) PCT No.: PCT/JP00/01490

§ 371 (c)(1),
(2), (4) Date: Nov. 5, 2001

(87) PCT Pub. No.: WO00/55295

PCT Pub. Date: Sep. 21, 2000

(30) Foreign Application Priority Data

Mar. 12, 1999 (JP) .................... 11/67323

(51) Int. Cl.
*B01F 7/04* (2006.01)
*B01F 7/18* (2006.01)
*C12M 1/02* (2006.01)
*C12M 1/10* (2006.01)

(52) U.S. Cl. .................. 435/289.1; 99/276; 99/277.2; 366/129; 366/149; 366/262; 366/325.92

(58) Field of Classification Search .................. 426/11, 426/18, 16, 15, 27, 29, 60, 62; 435/289.1; 99/276, 277.2; 366/129, 262, 325.92, 149; 210/205
See application file for complete search history.

(56) References Cited

U.S. PATENT DOCUMENTS

| 3,733,702 | A | * | 5/1973 | Robertson et al. ............ 99/462 |
| 4,188,407 | A | * | 2/1980 | Grylls et al. .................. 426/62 |
| 4,472,063 | A | * | 9/1984 | Eickelmann ................ 366/129 |

(Continued)

FOREIGN PATENT DOCUMENTS

EP     0 698 662     2/1996

(Continued)

OTHER PUBLICATIONS

Tohru Kouda, et al., "Effects of Oxygen and Carbon Dioxide Pressures on Bacterial Cellulose Production by Acetobacter in Aerated and Agitated Culture", Journal of Fermentation and Bioengineering, vol. 84, No. 2, 1997, pp. 124-127.

*Primary Examiner*—Arthur L. Corbin
(74) *Attorney, Agent, or Firm*—Oblon, Spivak, McClelland, Maier & Neustadt, P.C.

(57) ABSTRACT

According to the present invention, there is provided a stirred tank for storing yeast slurry to be supplied to fermentation tanks where fermented foods such as beer are fermented, is characterized in that a stirring impeller is provided within the stirred tank and so constructed that a maximum diameter of a rotation body defined by the rotation of the stirring impeller is 60-90% of the inner diameter of the stirred tank, and the height of the rotation body is 70% or more of a standard depth of the yeast slurry normally stored in the stirred tank.

7 Claims, 12 Drawing Sheets

U.S. PATENT DOCUMENTS

| | | | |
|---|---|---|---|
| 5,160,041 A * | 11/1992 | Taniguchi et al. | 210/205 |
| 5,382,092 A | 1/1995 | Okamoto et al. | |
| 5,399,014 A * | 3/1995 | Takata et al. | 366/262 |
| 6,244,741 B1 * | 6/2001 | Akamine et al. | 366/325.92 |

FOREIGN PATENT DOCUMENTS

| | | |
|---|---|---|
| JP | 57-164600 | 4/1981 |
| JP | 61-200842 | 9/1986 |
| JP | 4-129799 | 11/1992 |
| JP | 4-341188 | 11/1992 |
| JP | 5-30962 | 2/1993 |
| JP | 5-49890 | 3/1993 |
| JP | 5-29400 | 4/1993 |
| JP | 5-268933 | 10/1993 |
| JP | 6-105680 | 4/1994 |
| JP | 6-121666 | 5/1994 |
| JP | 7-34928 | 6/1995 |
| JP | 8-281089 | 10/1996 |
| JP | 9-220457 | 8/1997 |
| JP | 9-285725 | 11/1997 |
| JP | 10180228 * | 7/1998 |
| JP | 11-75815 | 3/1999 |
| WO | WO 99/13052 | 3/1999 |

\* cited by examiner

● TEMPERATURE MEASURING POINTS

EXAMPLE

COMPARATIVE EXAMPLE

ELECTRON MICROGRAPH
OF YEAST (× 5000)

AGITATION TANK FOR STORING BEER YEAST SLURRY

FIELD OF THE INVENTION

This invention relates to a stirred tank for storing yeast slurry, method of manufacturing fermented foods using the stirred tank, and a stirring impeller provided in the stirred tank. The present invention is applied particularly in a beer manufacturing process.

BACKGROUND OF THE INVENTION

Commonly, in the process of manufacturing fermented products such as beer, yeast recovered from a fermentation tank is stored in the stirred tank, and then returned as seed yeast to the fermentation tank for reuse.

Yeast stored in the stirred tank settles down on a bottom of the stirred tank as the time lapses, resulting in non-uniform yeast concentration in the stirred tank or non-uniform temperature when cooled. Hence, there arises a necessity to stir yeast slurry for overcoming such non-uniformity.

However, likewise butter, soap, etc., the yeast slurry is a non-Newtonian fluid. It is known that in such non-Newtonian fluid, stirring effect in proportion to the increase of the stirring force cannot be necessarily produced even with enhanced force unlike Newton fluid, in which the stirring effect is enhanced in proportion to the stirring force.

On the other hand, there also exists a necessity to protect yeast from damages due to stirring, along with the necessity to perform stirring for uniform yeast concentration and uniform temperature of yeast slurry.

In such a conventional process of manufacturing beer, an inclined paddle impeller, propeller or the like has been mainly used as a stirring impeller provided within the stirred tank for storing yeast slurry to be supplied to the fermentation tank.

However, in case that yeast slurry which is a non-Newtonian fluid is stirred by using such a conventional stirring impeller, there arises a problem that uniformly mixing of the entire yeast slurry is unlikely to be achieved through low-speed stirring.

On the other hand, there arises another problem in high-speed and strong stirring which is performed for improved uniformity in the yeast concentration and temperature of the yeast slurry, that yeast may be damaged and destroyed, and hence its biological activity may be lowered.

SUMMARY OF THE INVENTION

The present invention has been conceived to solve the above contradictory problems. It is an object of the present invention to stir and mix the entire yeast slurry within the stirred tank in a short period of time without causing poor mixing of the yeast slurry or a non-Newtonian fluid, as well as protect yeast from damages and hence prevent the deterioration of the biological activity.

To achieve the above object, the present invention was conceived as a stirred tank for storing yeast slurry and method of manufacturing fermented foods such as beer using the stirred tank, as well as a stirring impeller provided in the stirred tank.

According to the present invention, there is provided a stirred tank for storing yeast slurry to be supplied to fermentation tanks where fermented foods such as beer are fermented, is characterized in that a stirring impeller is provided within the stirred tank and so constructed that a maximum diameter of a rotation body defined by the rotation of the stirring impeller is 60-90% of the inner diameter of the stirred tank, and the height of the rotation body is 70% or more of a standard depth of the yeast slurry normally stored in the stirred tank.

According to another aspect of the present invention, there is provided a method of manufacturing fermented foods such as beer including the process of stirring yeast slurry in a stirred tank for storing the yeast slurry to be supplied to fermentation tanks where fermented foods such as beer are fermented, is characterized in that a stirring impeller is provided within the stirred tank and so constructed that a maximum diameter of a rotation body defined by the rotation of the stirring impeller is 60-90% of the inner diameter of the stirred tank, and the height of the rotation body is 70% or more of a standard depth of the yeast slurry normally stored in the stirred tank, and the method includes the process of stirring the yeast slurry by rotating the stirring impeller at a rotational speed of 1-30 rpm.

According to still another aspect of the present invention, there is provided a stirring impeller provided in a stirred tank for storing yeast slurry to be supplied to fermentation tanks where fermented foods such as beer are fermented, is characterized in that a maximum diameter of a rotation body defined by the rotation of the stirring impeller is 60-90% of the inner diameter of the stirred tank and the height of the rotation body is 70% or more of a standard depth of the yeast slurry normally stored in the stirred tank.

By those of the present invention, the yeast slurry within the stirred tank can be entirely and substantially uniformly mixed, so that the mixing and stirring effect can be remarkably enhanced as compared with a yeast stirred tank provided with a conventional inclined paddle impeller or the like.

Since the stirring impeller is so constructed that a maximum diameter of the rotation body defined by the rotation of the stirring impeller is 60-90% of the inner diameter of the stirred tank and the height of the rotation body is 70% or more of a standard depth of the yeast slurry normally stored in the stirred tank, a desirable stirring effect can be produced even through a relatively low rotational speed stirring at 1-30 rpm. As a result, there is produced an effect that the stirring is unlikely to damage and destroy yeast, and hence deteriorate its biological activity.

The maximum diameter of the rotation body enabling the rotation of the stirring impeller is in the range of 60-90%, and more preferably 70-90%.

With the rotation body having a maximum diameter of 70-90% of the inner diameter of the stirred tank, it is possible to more securely prevent the yeast slurry from stagnating in proximity to the inner wall of the stirred tank, thereby enabling the yeast slurry to be more uniformly stirred.

By the maximum diameter of the rotation body herein referred is meant a size (diameter) of a largest diameter portion of the rotation body defined by the rotation of the stirring impeller.

The height of the rotation body is 70% or more and more preferably 90-120% of a standard depth of the yeast slurry normally stored in the stirred tank.

With the rotation body having a height of 90-120% of the standard depth of the yeast slurry, it is possible to more uniformly stir and mix the yeast slurry and produce an effect to instantly eliminate foaming of yeast slurry generated as it is filled into the stirred tank.

By the standard depth of the yeast slurry is meant a depth of the yeast slurry, which is determined based upon designs of the stirred tank and operator's experiences in operation and maintenance. The standard depth of the yeast slurry is thus necessarily determined at a certain value according to each stirred tank used.

The stirring impeller is rotated at 1-30 rpm and more preferably 1-20 rpm.

With the stirring impeller rotated at 1-20 rpm, there is produced an effect of more securely preventing damages of yeast due to shearing force.

DETAILED DESCRIPTION OF THE PREFERRED EMBODIMENTS

The embodiments of the present invention will be described with reference to the drawings.

Embodiment 1

Figure 1:
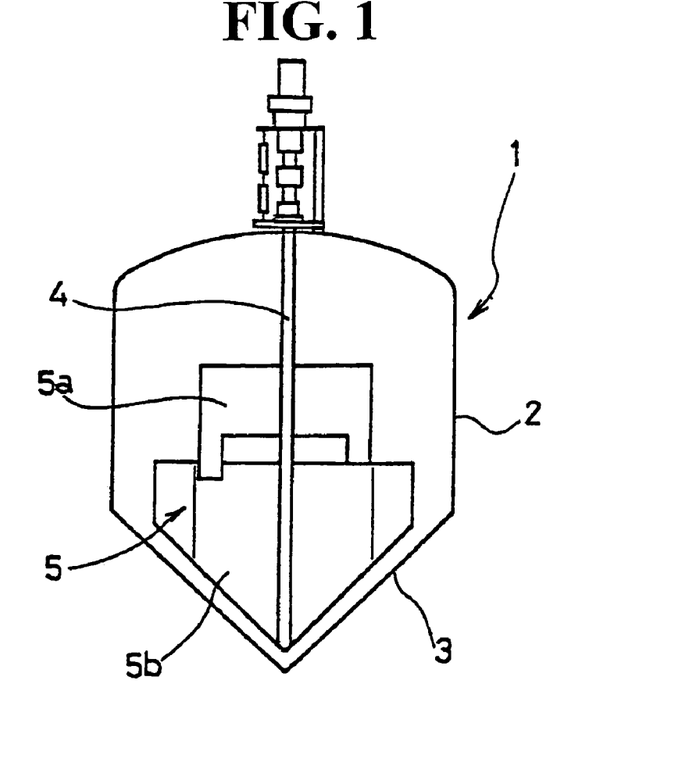
FIG. 1 is a schematic front view illustrating a typical arrangement of the yeast stirred tank according to one embodiment of the present invention.

As illustrated in FIG. 1, the stirred tank has a tank body 1 with a shell portion 2 having a substantially cylindrical shape and bottom portion 3 having an inverted cone shape.

Rotational shaft 4 extends substantially through the center of the tank body 1 and has upper part and lower part to which paddle blades 5a, 5b are respectively mounted at a perpendicular orientation.

Figure 2:
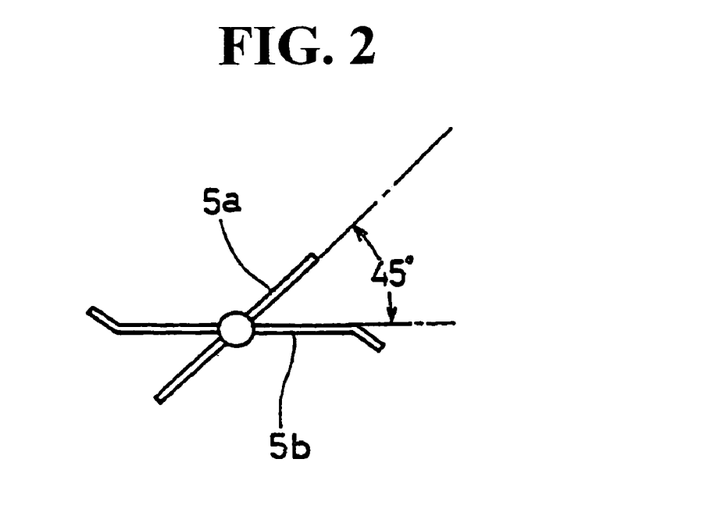
FIG. 2 is a schematic plan view illustrating an arrangement of paddle blades of the yeast stirred tank.

The upper paddle blades 5a intersect the lower paddle blades 5b at an angle of 45 degrees, as illustrated in FIG. 2.

The stirring impeller 5 made up of both paddle blades 5a, 5b is set so that a maximum diameter of a rotation body defined by the rotation of the stirring impeller 5 is 60-90% of the inner diameter of the stirred tank.

The height of the rotation body defined by the rotation of the stirring impeller 5 is set to be 70% or more of a standard depth of yeast slurry normally stored in the stirred tank.

The lower paddle blades 5b have lower sides each having a slanting surface to match the inverted cone shape of the bottom portion 3 of the tank body 1.

Figure 3:
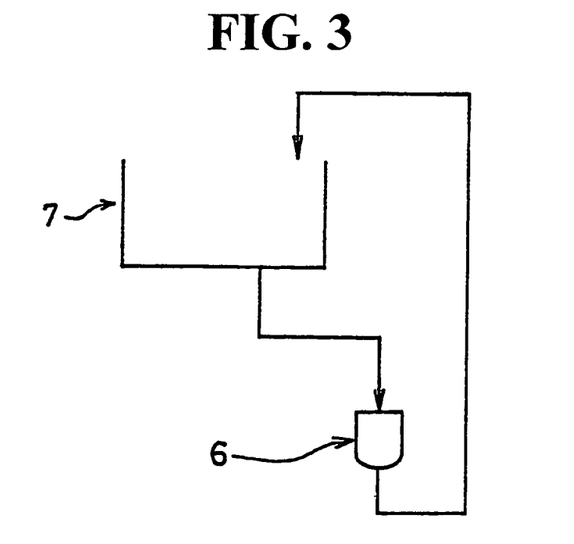
FIG. 3 is a schematic block diagram illustrating an arrangement of a positional relationship between the yeast stirred tank and a main fermentation tank.

The stirred tank 6 having the above arrangement is in actual use disposed on the downstream side of main fermentation tank 7 for manufacturing beer, as illustrated in FIG. 3.

The processes of manufacturing beer include such as a malt saccharifying process and yeast fermentation process, which fermentation process involves storing a part of the yeast discharged from the main fermentation tank 7 in the stirred tank 6 and recirculating the same as seed yeast to the fermentation tank 7.

Yeast stored within the stirred tank 6 must be uniformly stirred.

It is possible to entirely and uniformly stir and mix yeast even through such a low speed stirring as not to damage the yeast, by using the stirred tank 6 as in the above embodiment.

In this case, the upper and lower paddle blades 5a, 5b disposed within the stirred tank respectively cause discharging flows flowing therefrom, and which flows are unlikely to interfere with each other, so that the flows of the yeast slurry can be smoothly connected with each other.

Also, since the maximum diameter of the rotation body defined by the rotation of the stirring impeller 5 is set to be 60-90% of the inner diameter of the stirred tank, the yeast slurry can flow even in proximity to the inner wall of the stirred tank, and the yeast is unlikely to be damaged.

This will be hereinafter described in more detail. Where the maximum diameter of the rotation body is 60% or less of the inner diameter of the stirred tank, the yeast slurry in proximity to the inner wall of the stirred tank is unlikely to flow. As a result, the yeast slurry cannot be uniformly stirred, and hence the yeast at its slipping interface between non-flow part and flow part is damaged due to shearing force.

On the other hand, where the maximum diameter of the rotation body is 90% or more, there is caused a smaller clearance between the stirring impeller and the inner wall of the stirred tank, so that large shearing force is produced between the stirring impeller and the inner wall of the stirred tank. This may cause damages to yeast, and deteriorate a vertically mixing effect, hence producing non-uniform mixture.

Thus, the maximum diameter of the rotation body defined by the rotation of the stirring impeller 5 is set to be 60-90% of the inner diameter of the stirred tank, preferably 70-90%, more preferably 75-90% and most preferably 80-90%.

There are respectively caused less variation in yeast concentration when employing 70% or more of the maximum diameter, lesser variation and much lesser variation when employing 75% or more and 80% or more, thereby producing a more uniform stirring and better stirring effect.

Since the height of the rotation body defined by the stirring impeller is set to be 70% or more of a standard depth of the yeast slurry normally stored in the stirred tank, a poor mixture is hardly caused.

Where the height of the rotation body is set at less than 70%, a stagnant portion may cause in the yeast slurry, resulting in non-uniform distribution of the yeast concentration and temperature within the stirred tank.

In particular, the height of the rotation body is preferably in the range of 90-120% of the standard depth.

With the height of 90% or more, the upper edges of the stirring impeller are near the top surface of the yeast slurry having the standard depth. As a result, more uniform stirring and mixture can be achieved and continued from the time at which the yeast slurry has the standard depth to the time at which the entire volume of the yeast slurry is discharged. There is also produced an effect to instantly eliminate foaming of yeast slurry generated as it is filled into the stirred tank.

On the other hand, with the rotation body having a height of 120% or less, the upper edges of the stirring impeller are slightly above the top surface of the yeast slurry having the standard depth, thereby achieving more uniform stirring and mixture, and producing the effect to eliminate the foaming.

Figure 4:
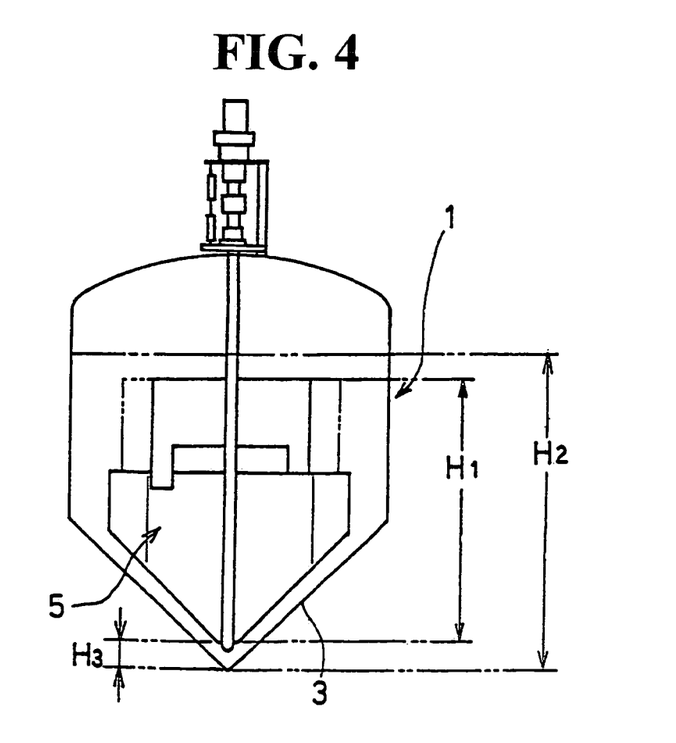
FIG. 4 is a schematic front view for illustrating the height of the rotation body and the standard depth of the yeast slurry normally stored in the stirred tank.

By the height $H_1$ of the rotation body is meant herein a distance between the upper end of the rotation body defined by the rotation of the stirring impeller 5 and the lower end thereof, as illustrated in FIG. 4.

By the standard depth $H_2$ of the yeast slurry is meant herein a distance between the top surface of yeast slurry stored within the tank body 1 and the lowest part of the bottom portion 3 of the tank body 1 (i.e., the apex of the inverted cone), with the yeast slurry having a standard volume or having a volume which is determined based on designs of the stirred tank and operator's experiences in operation and maintenance. Thus, the standard volume of the yeast slurry is necessarily determined at a certain value according to each stirred tank used. The space above the top surface of the yeast slurry having the standard depth is reserved for an expansion volume of the yeast slurry due to its foaming.

Therefore, the standard volume of the yeast slurry stored within the stirred tank is meant for only liquid and yeast.

The distance $H_3$ between the lower end of the rotation body and the lowermost part of the bottom portion 3 of the tank body 1 is determined in such a manner as to enable uniform stirring and mixing of yeast slurry without damaging yeast due to the stirring. When this distance is excessively short, yeast may be damaged during the stirring. On the other hand, when the distance is excessively large, uniform stirring is hardly achieved.

The stirring impeller is stirred at a rotational speed of 1-30 rpm.

The stirring and mixture of the yeast slurry is hardly performed when the rotational speed is less than 1 rpm, and on the other hand, yeast is damaged by shearing force due to large increase in torque when the rotational speed exceeds 30 rpm.

Particularly, at a rotational speed in a range of 1-20 rpm, damages of yeast due to shearing force can be more securely prevented.

Where the yeast cells entirely precipitate in the stirred tank and to be uniformly dispersed, or where the yeast slurry is to be instantly cooled, or where the foaming of the yeast slurry is to be suppressed, the stirring had better be performed for a relatively short period of time at a rotational speed of 10 rpm or more. Where the temperature of the yeast slurry is to be maintained, stirring had better be continuously performed at a remarkably low speed near 1 rpm, or stirring had better be intermittently performed at a low speed of 1-10 rpm, so that damages of the yeast can be prevented.

Particularly, since yeast slurry can be stirred from its precipitated and settled state to uniform concentration state, it is desirable to hold yeast under the intermittent stirring condition at a minimum low speed after cooling. There is no problem even if the yeast cells happen to precipitate.

The upper paddle blades 5a intersect the lower paddle blades 5b at an angle of 45 degrees as viewed from above, this phase difference causes a smooth vertical flow of the yeast slurry.

Thus, a uniform stirring and mixture can be produced within the stirred tank 6 through the effects described above.

Other Embodiments

The paddle blades disposed in two stages along the vertical axis in the above embodiment may be disposed in three or more stages.

In the above embodiment, the upper and lower paddle blades are disposed at an intersecting angle of 45 degrees as viewed from above. This intersecting angle is also not limited to that embodiment.

However, it is preferable to set the intersecting angle in a range of 30-90 degrees in order to generate a somewhat smooth vertical flow of the yeast slurry.

The construction of the stirred tank 6 is also not necessarily limited to such a construction having the paddle blades 5a, 5b disposed on the rotational shaft 4 in plural stages. Rather, various constructions can be employed.

It is possible to employ a stirring impeller of a large-sized flat plate blade with numbers of holes formed therein as disclosed in Japanese Patent Application Laid-open No. Hei-7-786, that of a plurality of large-sized vertically oriented flat plate blades respectively mounted at angles displaced from each other as disclosed in Japanese Patent Application Laid-open No. Sho-61-200842 and Japanese Patent Laid-open No. Hei-8-281089, or that of large-sized vertically oriented flat plate blades having a substantially trapezoidal shape and plate-like auxiliary blades mounted on a rear side thereof with spacing therefrom as disclosed in Japanese Utility Model Application Laid-open No. 7-34928.

However, the stirring impeller of the present invention is preferably made up of blades each of which can have a shape, size and mounting means more variable in a vertical orientation than simple anchor blades, paddle blades and lattice blades, thereby achieving vertical flow of the slurry through such variations.

In a stirred tank which requires a sanitary property of beer yeast and the like, it is preferable to omit slantingly disposed blades or holes which may cause blind spots in cleaning operation of the stirred tank, and to have the stirring impeller vertically arranged with no holes or any other openings therein.

In other words, it is preferable to have the stirring impeller with no bolts or joints within the stirred tank and made up of smoothly curving surfaces and vertically oriented surfaces with no horizontally oriented surfaces which may deteriorate cleanability.

Since the stirring impeller is capable of sufficiently mixing the yeast slurry even without baffle plates, there is no necessity to provide the baffle plates, which may result in deterioration in cleanability of the stirred tank.

A sufficient cleaning effect can thus be produced and an accident such as microbial contamination can be avoided by using such stirring impeller.

The description of the above embodiment was made by taking for example the case where the yeast stirred tank is used for manufacturing beer. However, the yeast stirred tank of the present invention is not necessarily limited to this application. Rather, it can be used for stirring products other than beer.

The yeast slurry mainly used has a concentration of 30-60%.

By the concentration of the yeast slurry herein is meant a volume percentage of the yeast to a liquid medium.

EXAMPLES

Example 1

In this example, the testing was conducted to determine the relationship between the stirring time and the variation in pH of the yeast slurry.

The stirred tank used in this example has a volume of 4 m$^3$, an inner diameter of 1900 mm, and a stirring impeller having a maximum diameter of 60% of the inner diameter of the stirred tank.

The stirring impeller was so constructed that the rotation body defined by the rotation of the stirring impeller has a height of 1490 mm. As a result, the height of the rotation body is 97% of the standard depth of the yeast slurry, and the upper edges of the stirring impeller are about 50 mm above the top surface of the yeast slurry having the standard depth.

The stirring impeller also has the upper and lower paddles 5a, 5b disposed along the vertical axis and intersecting each other at an angle of 45 degrees.

In this embodiment, the stirring was performed at a low speed of 20 rpm.

On the other hand, an inclined paddle impeller was used as a comparative example.

This inclined paddle impeller has a maximum diameter of 800 mm when it is rotated, while the stirred tank has an inner diameter of 2200 mm, so that the rotation body defined by the rotation of the rotational shaft has a maximum diameter of about 36% of the inner diameter of the stirred tank.

In the comparative example, the stirring was performed at a rotational speed of 58 rpm.

Figure 5:
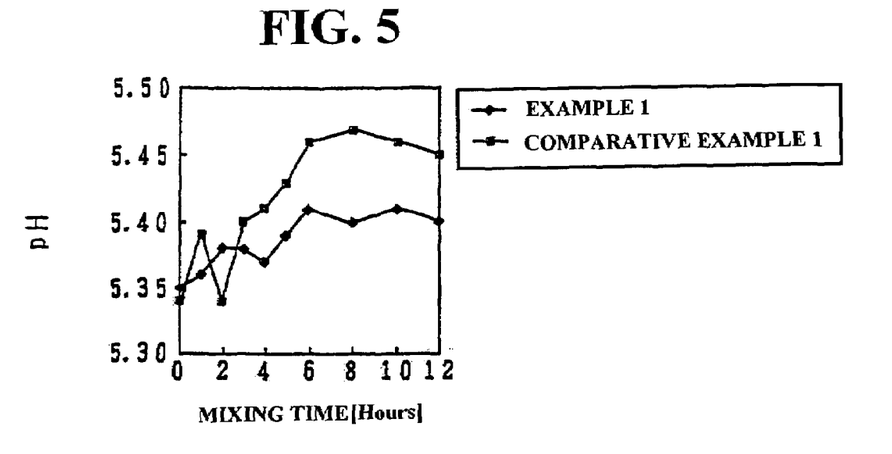
FIG. 5 is a graph showing the relationship between the stirring time and pH of the yeast slurry.

The result is shown in FIG. 5.

As is apparent from FIG. 5, less variation in pH of the yeast slurry was observed in this example on the contrary to the comparative example where variation in pH of the yeast slurry was greatly varied as the stirring time elapsed.

It could be confirmed from this result that in this example less damages to the yeast slurry were caused as compared with the comparative example.

Figure 16:
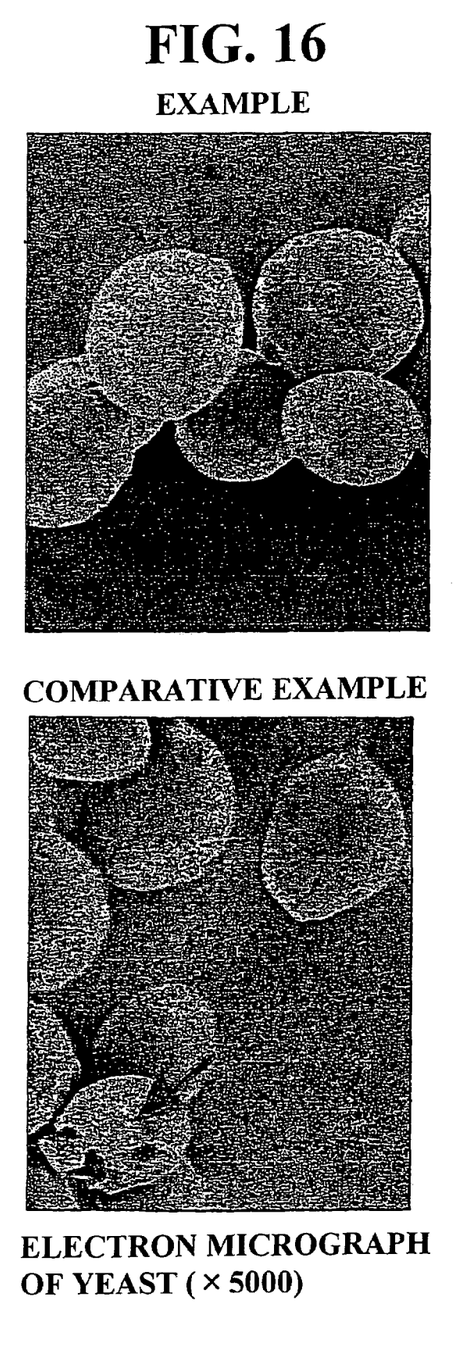
FIG. 16 is copies of an electron micrograph showing the states of yeast cells after they have been stirred by the stirring impeller.

The condition of yeast after the stirring was observed through an electron microscope and it was found that the stirring with the inclined paddle impeller of the comparative example apparently caused damages to the yeast, as shown in FIG. 16.

On the other hand, the yeast slurry stirred by using the stirred tank of this example had yeast with no damages and held in a good condition.

Example 2

In this example, the measurement of the variation in yeast concentration at the time of discharging the yeast slurry was conducted.

The stirred tank used in this example has a volume of 5 m$^3$ and an inner diameter of 2200 mm.

The stirring impeller was so constructed that the rotation body defined by the rotation of the rotational shaft has a maximum diameter of about 83% of the inner diameter of the stirred tank.

The stirring impeller was also so constructed that the rotation body defined by the rotation of the stirring impeller has a height of 1993 mm. As a result, the height of the rotation body is 93% of the standard depth of the yeast slurry, and the upper edges of the stirring impeller are about 50 mm above the top surface of the yeast slurry having the standard depth.

In this example, the stirring was performed at a rotation speed of 20 rpm (example 2-1) and 5 rpm (example 2-2), respectively.

On the other hand, a stirred tank provided with a propeller-type stirring impeller was used as comparative example 2-1.

The inner diameter of the stirred tank was 2800 mm, and the rotation body defined by the rotation of the propeller-type stirring impeller had a maximum diameter of 1600 mm. Accordingly, the maximum diameter of the rotation body is about 57% of the inner diameter of the stirred tank. The rotational speed was 70 rpm.

A frame-type stirring impeller having an inverted trapezoidal shape was used as comparative example 2-2.

The inner diameter of the stirred tank was 2500 mm and the rotation body defined by the rotation of the flame-type stirring impeller having the inverted trapezoidal shape was 1400 mm. Accordingly, the maximum diameter of the rotation body is about 56% of the inner diameter of the stirred tank. The rotational speed was 70 rpm.

Figure 6:
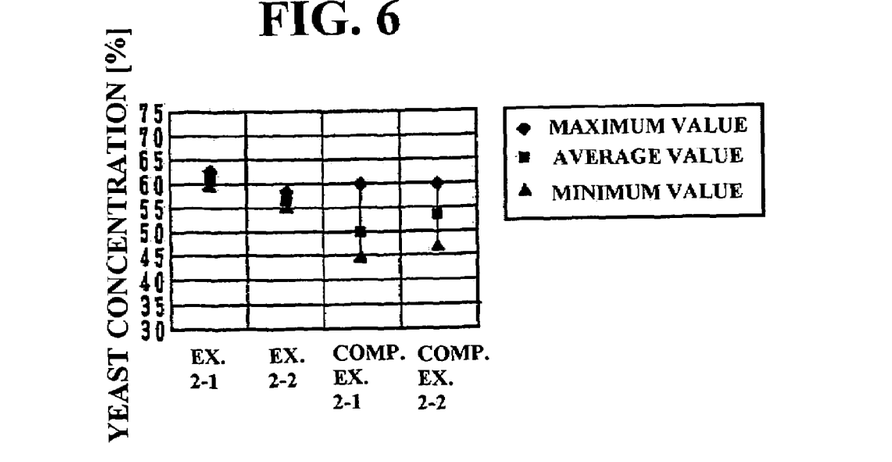
FIG. 6 is a graph showing variation in yeast concentration.

The test result is shown in FIG. 6.

As is apparent from FIG. 6, the yeast concentration was varied within a range of 15% in the respective comparative examples. On the contrary, the yeast concentration was varied within a range of 5% in this example.

It can thus be determined from this result that yeast in this example was more uniformly stirred than the comparative examples.

Example 3

In this example, the relationship between the number of times yeast in the stirred tank is discharged therefrom and the pH of the yeast slurry was determined.

After storing the yeast slurry within the stirred tank, a certain amount of the yeast slurry was discharged every three hours. The discharge was performed eight times and variation in pH value was measured upon discharged number.

More specifically, the stirring was performed at a rotational speed of 10 rpm for 10 minutes before the discharge, and the pH of the discharged yeast slurry was measured.

The stirring impeller used was so constructed that the rotation body defined by the stirring impeller when the rotational shaft was rotated has a maximum diameter of about 83% of the inner diameter of the stirred tank.

The height of the rotation body was set so as to be 93% of the standard depth of the yeast slurry in any cases.

Figure 7:
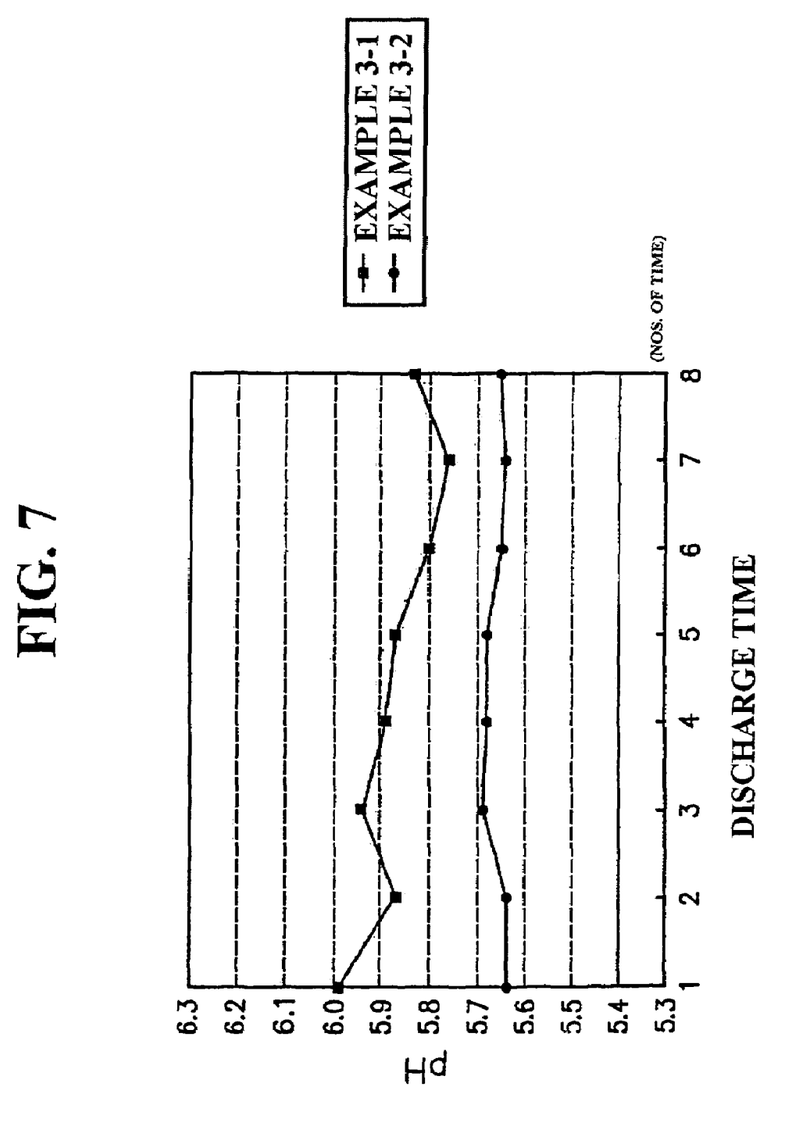
FIG. 7 is a graph showing the relationship between the number of times yeast slurry is discharged from the stirred tank and the pH.

The test result is shown in FIG. 7.

As is apparent from FIG. 7, in either of the examples 3-1 and 3-2, the pH of the yeast slurry was varied within a range of 0.2, although the discharging operation was performed eight times in 24 hours.

It can thus be determined from this result that nearly no damages to yeast were observed in both examples 3-1 and 3-2.

Example 4

In this example, the testing was conducted to determine the relationship between the number of times yeast in the stirred tank is discharged therefrom and the yeast concentration.

After storing the yeast slurry within the stirred tank, a certain volume of the yeast slurry was discharged every three hours in the same manner as the example 3. The discharge was performed eight times and variation in pH value was measured upon discharged time.

The variation in yeast concentration was measured through variation in value of a cell sensor.

Yeast in living state is positively charged and that in dead state is negatively charged.

It is possible to confirm whether yeast is in living or dead state by measuring the dielectric constant of the yeast slurry. The cell sensor is designed to detect the living or dead state of the yeast and convert it into the yeast concentration.

Three type of stirred tanks are used, each having a rotation body defined by the stirring impeller when the rotational shaft is rotated, which rotation bodies respectively have maximum diameters of about 60% (example 4-1), about 75% (example 4-2) and about 83% (example 4-3) of the inner diameter of the stirred tanks.

The height of each rotation body was set to be 93% of the standard depth of the yeast slurry.

Figure 8:
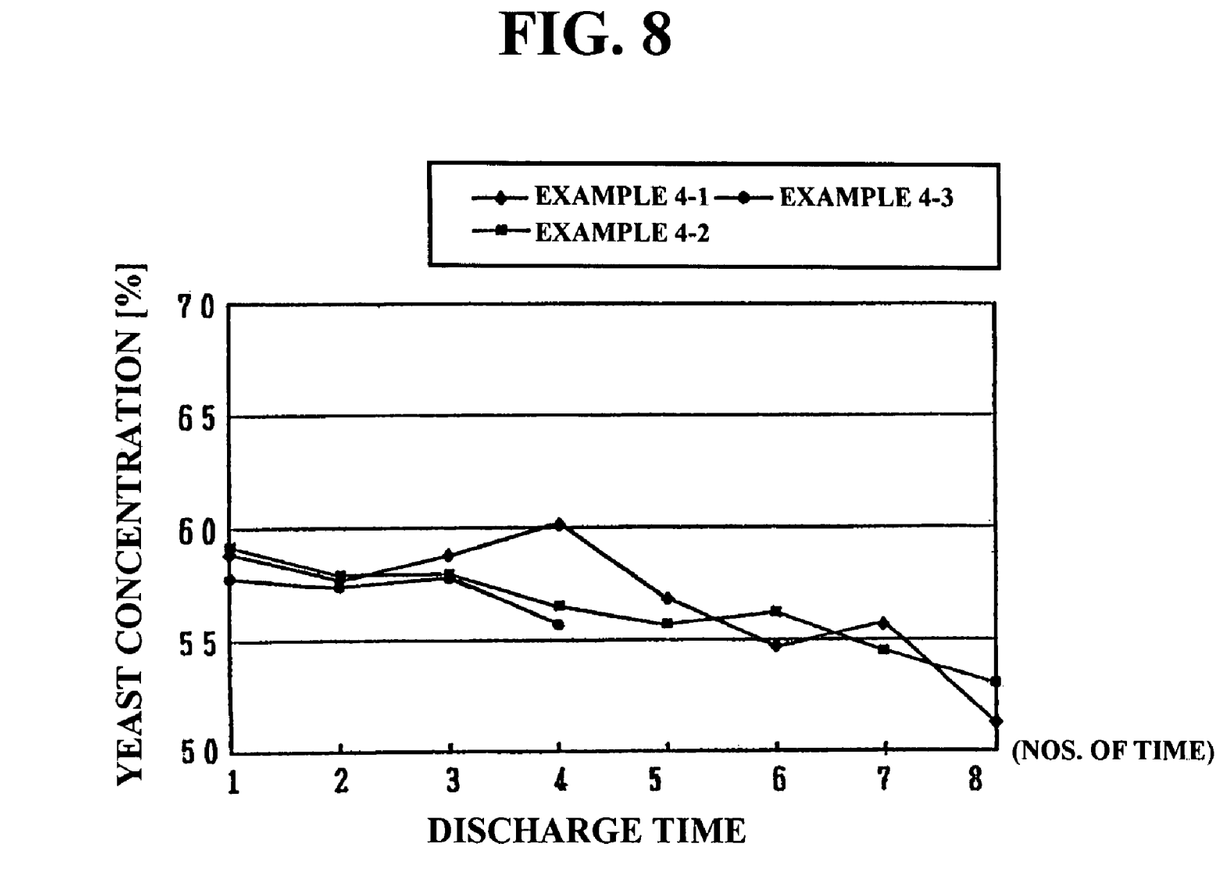
FIG. 8 is a graph showing the relationship between the number of times yeast slurry is discharged from the stirred tank and the yeast concentration.

The test result is shown in FIG. 8.

As is apparent from FIG. 8, although the discharging operation was performed eight times in the examples 4-1 and 4-2, and four times in the example 4-3, the yeast concentration was varied within a range of 8%.

Particularly in the example 4-2 with the rotation body having a maximum diameter of about 75% of the inner diameter of the stirring impeller, the yeast concentration was varied within a range of about 5%, and in the example 4-3 with the rotation body having a maximum diameter of about 83% of the inner diameter of the stirring impeller, the yeast concentration was varied within a range of about 3%.

It could be confirmed from this result that less damages to yeast were caused in the respective examples, and nearly no damages to yeast were observed particularly in the examples 4-2 and 4-3.

It could also be confirmed that more uniform stirring had been achieved by the stirred tank with the rotation body having a maximum diameter of 70% or more and further a maximum diameter of 80% or more of the inner diameter of the stirred tank than the stirred tank with the rotation body having a maximum diameter of about 60%.

Example 5

In this example, the temperature variation at respective points of the yeast slurry within the stirred tank was measured.

In this example, the same stirred tank as that in the example 1 was used.

Specifically, the stirred tank used in this example has a volume of 4 m³, and an inner diameter of 1900 mm, and so installed that the rotation body has a maximum diameter (i.e., impeller diameter) of 1140 mm, and a height of 1490 mm. As a result, the height of the rotation body is 97% of the standard depth of the yeast slurry.

The temperatures of the yeast slurry which was stirred at 1 rpm and 20 rpm within the stirred tank were measured upon elapsed time.

Specifically, a temperature variation of the yeast slurry within the stirred tank was measured by a temperature sensor upon elapsed time by rotating the stirring impeller within the stirred tank at 1 rpm and 20 rpm, and the effect produced by the stirring was evaluated.

Figure 9:
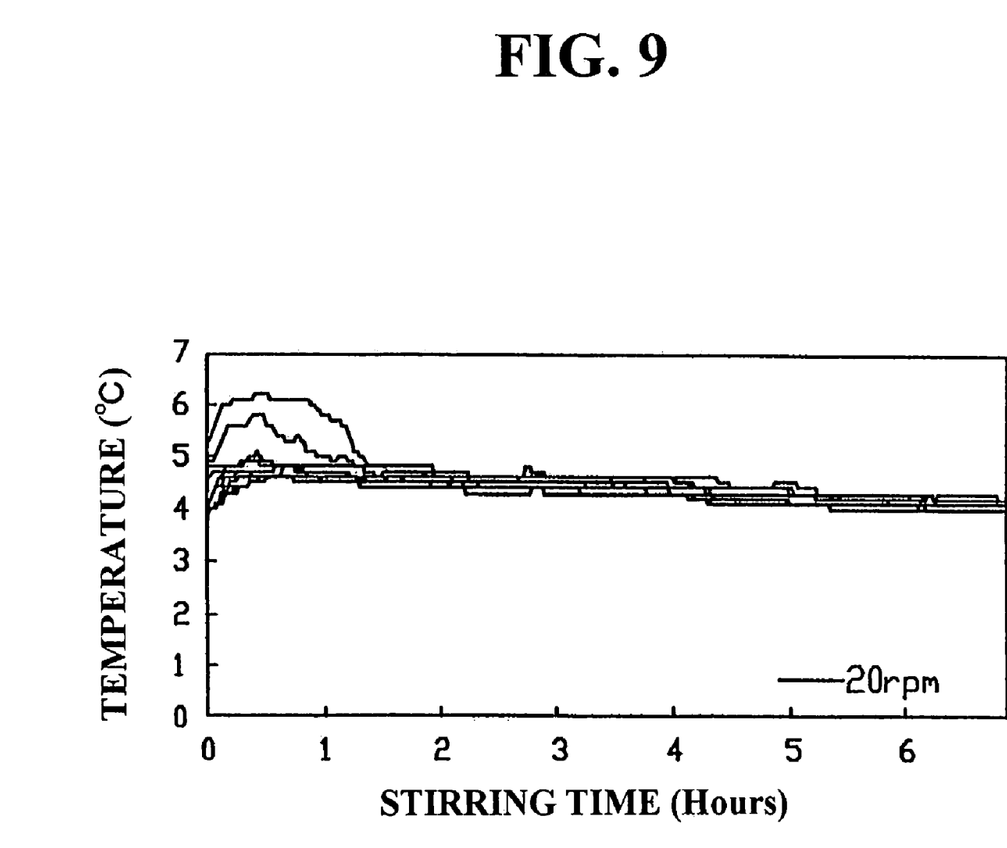
FIG. 9 is a graph showing the relationship between the local temperatures in the stirred tank and the stirring time
Figure 10:
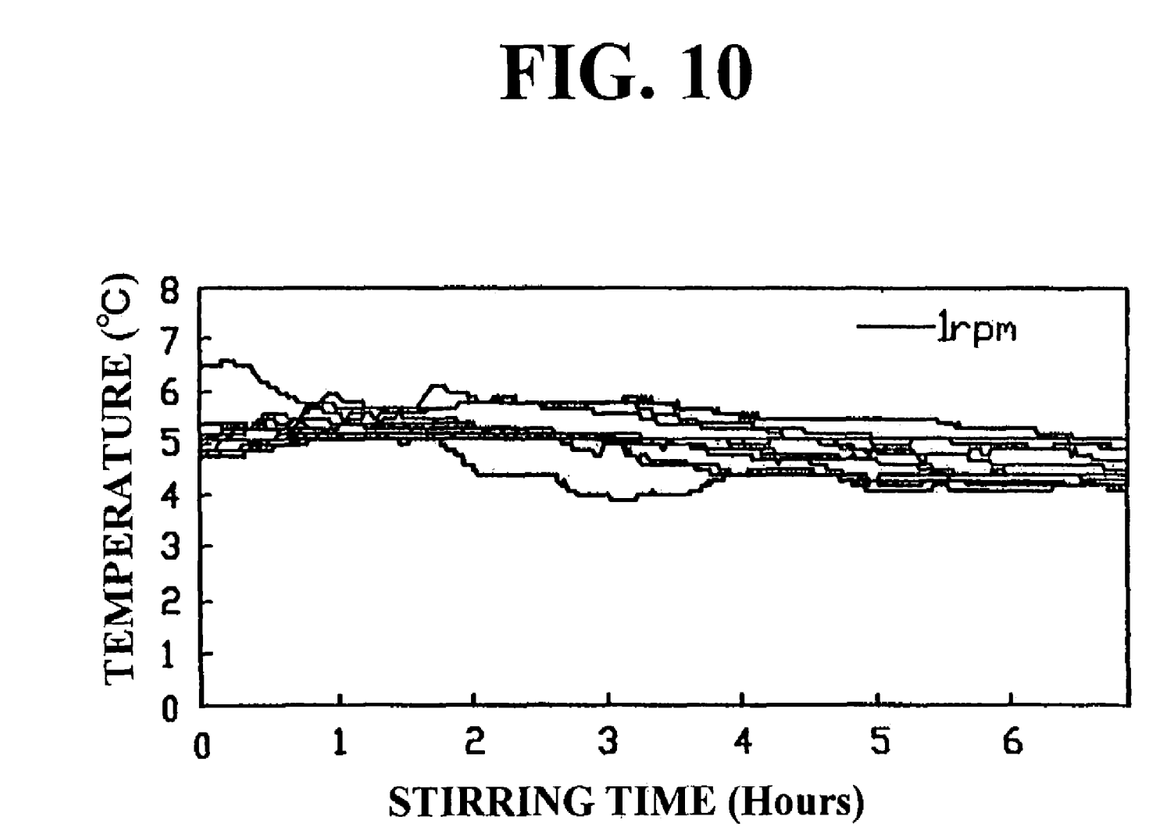
FIG. 10 is a graph showing the relationship between the local temperatures in the stirred tank and the stirring time.

The results are shown in FIGS. 9 and 10.

Figure 11:
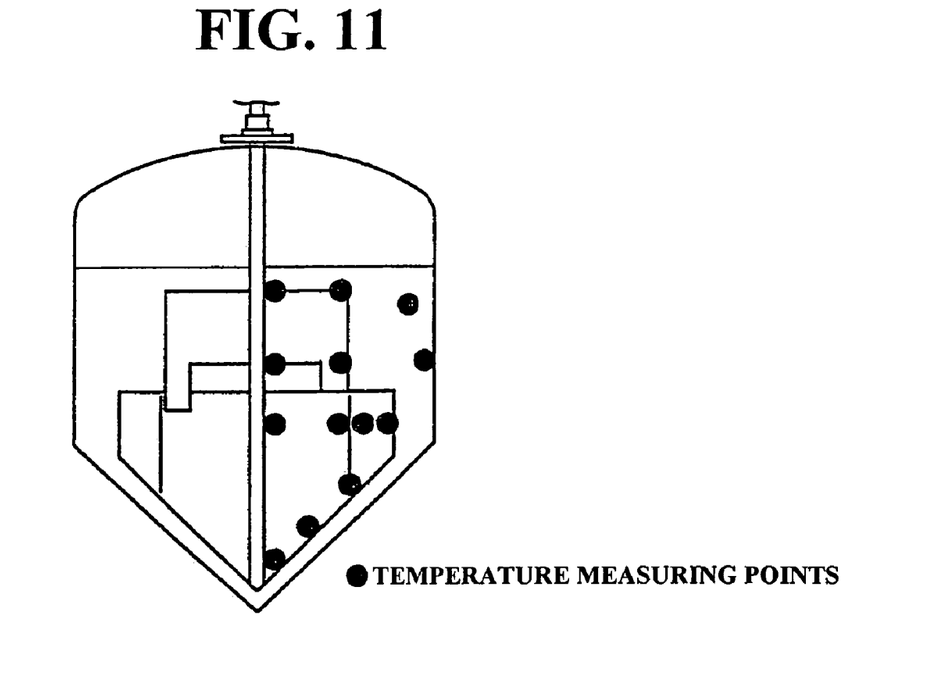
FIG. 11 is an explanatory view illustrating the temperature measuring points within the stirred tank.
Figure 12:
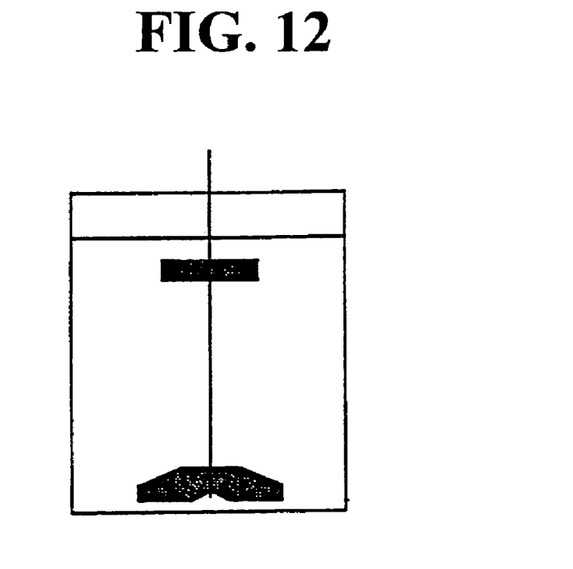
FIG. 12 is an explanatory view illustrating a stirring impeller of a comparative example.

The temperature measuring points of the yeast slurry within the stirred tank are shown in FIG. 11.

As shown in FIGS. 9-11, there was observed less variation in temperature due to a difference in measuring point within the stirred tank. It can be seen that non-uniform temperature distribution mostly disappeared when the stirring was performed at 20 rpm.

From the above fact, it can be seen that the yeast slurry within the stirred tank can be stirred so as to have a uniform temperature even through the rotation at a much lower speed of 1-20 rpm, and the yeast slurry is maintained at a constant temperature.

Example 6

In this example, the testing was conducted to determine the temperature followability of the yeast slurry within the stirred tank.

In this example, the stirred tank used in this example has a volume of 4 m³, and an inner diameter of 1900 mm, and so installed that the rotation body has a maximum diameter of 1140 mm, and a height of 1490 mm, in the same manner as the example 1. The height of the rotation body is thus 97% of the standard depth of the yeast slurry.

This stirring impeller was stirred at 20 rpm. As a comparative example, a two-stage paddle impeller was used and stirred at 53 rpm. The result is shown in FIG. 13.

Generally, the storage temperature of the yeast slurry is controlled according to a time chart. A cooling medium is circulated within a jacket on the periphery of the stirred tank to cool the yeast slurry within the stirred tank until the temperature of the yeast slurry within the stirred tank reaches a preset temperature.

Accordingly, where the temperature followability of the yeast slurry within the stirred tank is poor, the yeast slurry around the center of the stirred tank remains uncooled, while the yeast slurry near the peripheral side of the stirred tank is rapidly cooled. As a result, a temperature difference between the respective points of the yeast slurry within the stirred tank is caused, so that the cooling efficiency of the stirred tank is deteriorated.

Figure 13:
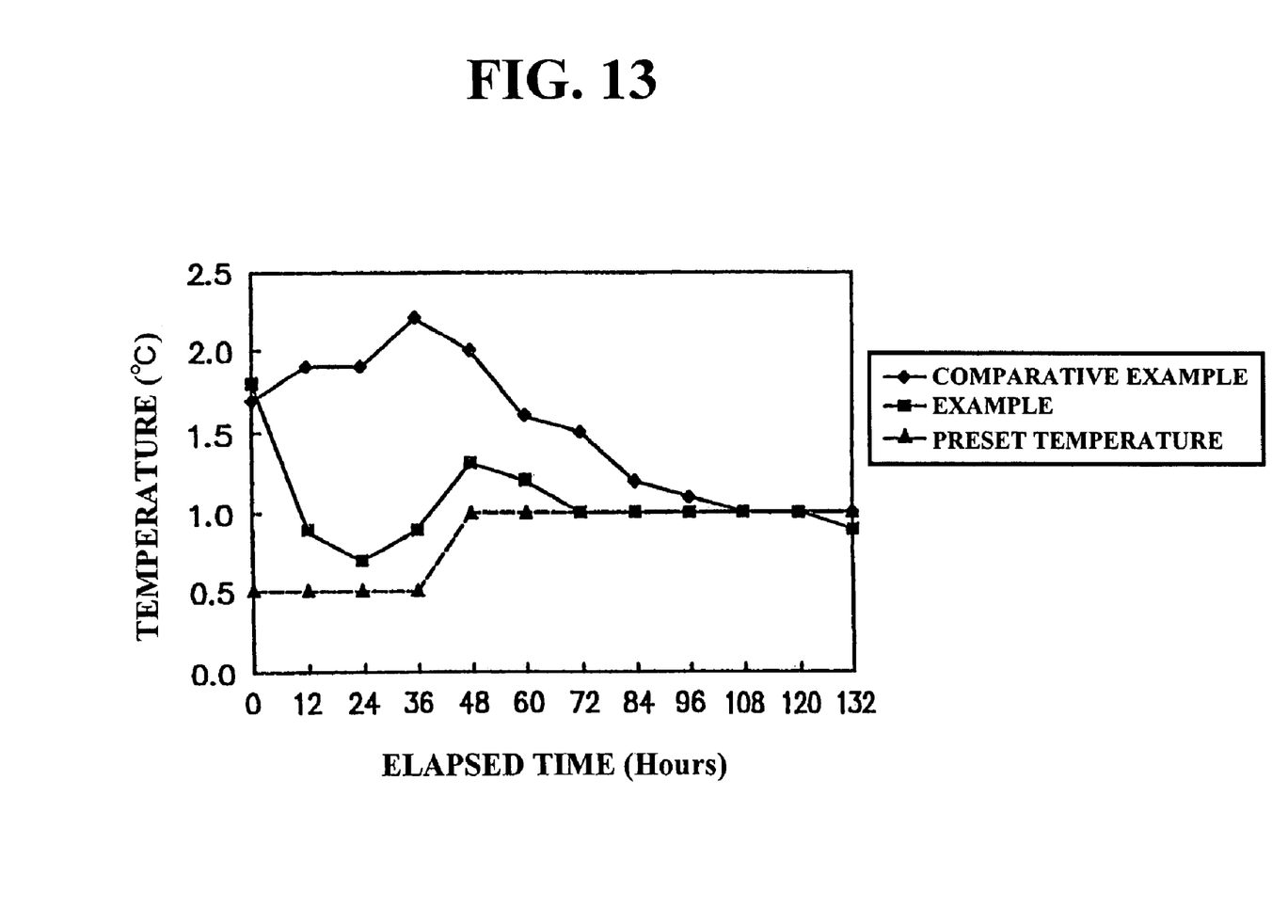
FIG. 13 is a graph showing the relationship between the yeast slurry temperature in the stirred tank and the elapsed time.

FIG. 13 therefore shows the measured results of the temperature followability of the yeast slurry within the stirred tank in the cases where the yeast slurry was stirred by using the stirred tank of this example, and the stirred tank of the comparative example.

As shown in FIG. 13, even through a lower stirring speed of the stirring impeller at 20 rpm, the temperature followability in this example is better than the comparative example. It can be thus seen that uniform stirring can be produced in a short period of time even if the high-speed stirring is not performed. The yeast slurry can also sufficiently follow a subtle temperature setting, so that the temperature of the yeast can be properly controlled.

Example 7

In this example, the alive cell percentage of yeast was measured.

Specifically, hereinafter described three types of stirred tanks were used, and the alive cell percentages of yeast were determined before and after the stirring of the yeast slurry.

The yeast was stained with methylene blue and observed by a microscope, and the live cells were counted by using a hematite meter.

Example 7-1

The stirred tank in this example has a volume of 5 m$^3$ and an inner diameter of 2100 mm, and is so installed that the rotation body of the stirring impeller has a maximum diameter (impeller diameter) of 1745 mm, and a height of 1993 mm. Thus, the height of the rotation body was 93% of the standard depth of the yeast slurry.

The yeast slurry was stirred at 5 rpm for 36 hours within the stirred tank, and the alive cell percentage of yeast was measured.

Example 7-2

The stirred tank in this example has a volume of 5 m$^3$ and an inner diameter of 2100, and so installed that the rotation body of the stirring impeller has a maximum diameter (impeller diameter) of 1745 mm and a height of 1993 mm. Thus, the height of the rotation body was 93% of the standard depth of the yeast slurry.

The yeast slurry was stirred at 5 rpm for 33 hours within the stirred tank, and the alive cell percentage of yeast was measured.

Example 7-3

The stirred tank in this example has a volume of 5 m$^3$ and an inner diameter of 2100, and so installed that the rotation body of the stirring impeller has a maximum diameter (impeller diameter) of 1745 mm and a height of 1993 mm. Thus, the height of the rotation body was 93% of the standard depth of the yeast slurry.

The yeast slurry was stirred at 5 rpm for 39 hours within the stirred tank, and the alive cell percentage of yeast was measured.

Figure 14:
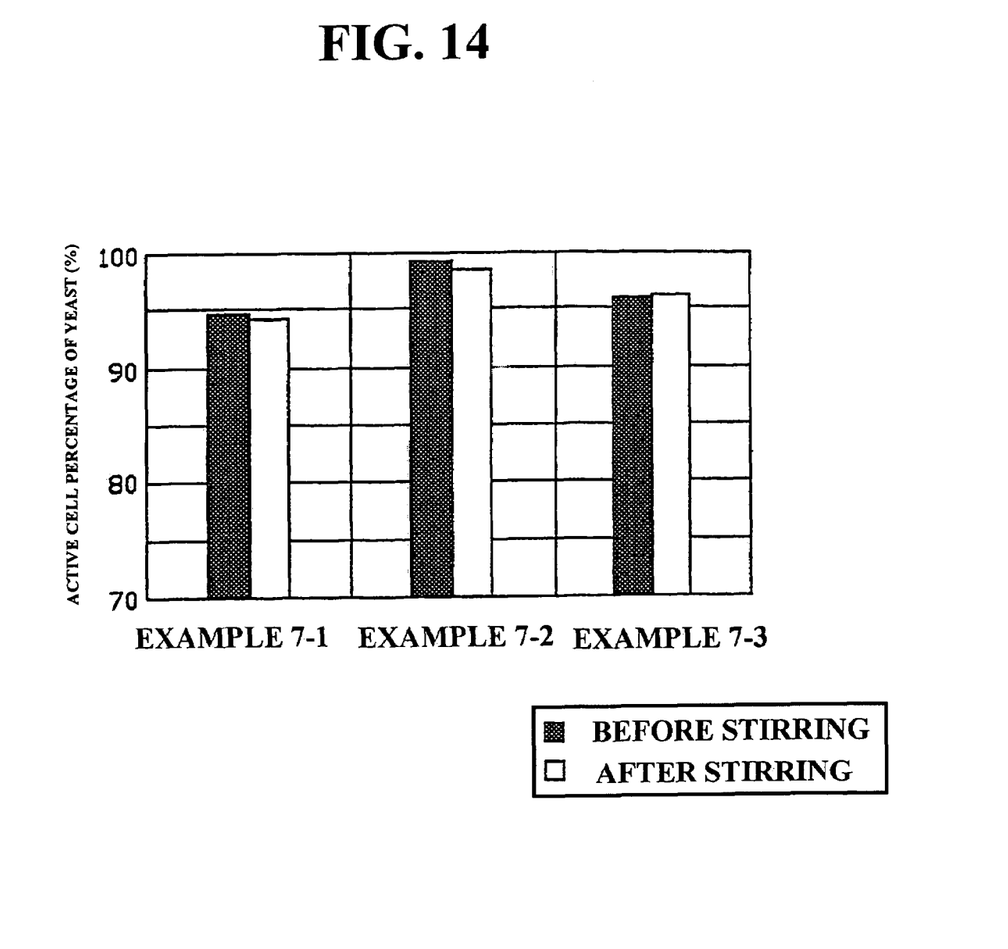
FIG. 14 is a graph showing alive cell percentage of yeast.

The measured results on the alive cell percentages of the yeast cells before and after the stirring under the above conditions are shown in FIG. 14.

As is apparent from FIG. 14, there were nearly no differences in alive cell percentage of the yeast before and after the stirring in this example. It can be seen from this fact that the yeast cells are not damaged by the stirring.

Example 8

In this embodiment, the testing was conducted to determine the relationship between the rotational speed of the stirring impeller and the shaft torque of the stirring impeller. The testing was conducted with the yeast slurry having the standard depth in the same manner as the examples 7.

Figure 15:
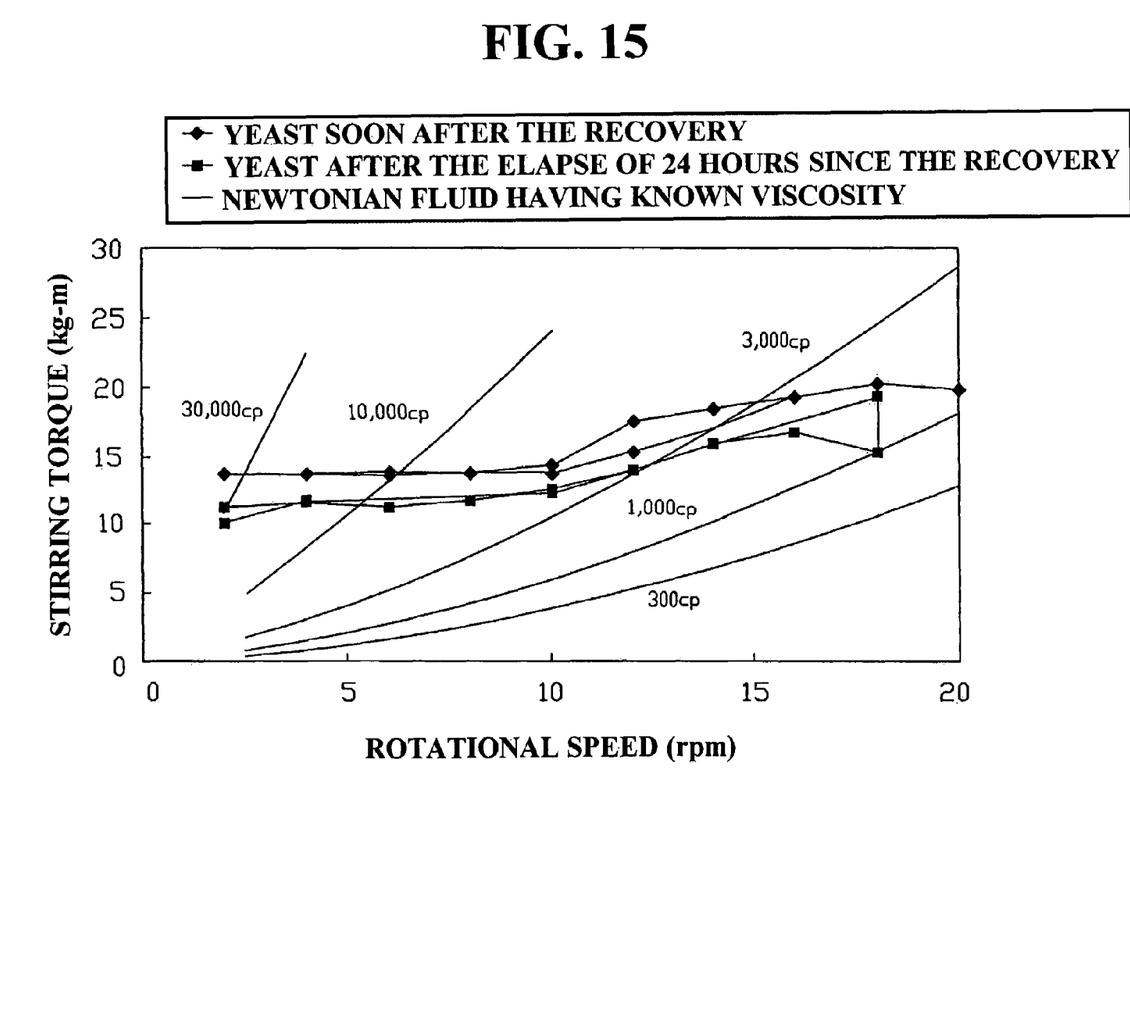
FIG. 15 is a graph showing the relationship between the rotational speed of the stirring impeller and the shaft torque of the stirring impeller.

FIG. 15 shows the above relationships determined on yeast soon after the recovery and yeast after the elapse of 24 hours since the recovery, as well as a known Newtonian fluid.

As shown in FIG. 15, the shaft torque required for the yeast soon after the recovery is larger than the shaft torque for the yeast after the elapse of 24 hours since the recovery.

In FIG. 15, the crossing points of the lines representative of data of the yeast and the lines representative of data of the Newtonian fluid indicate that the apparent viscosity of the yeast slurry at each rotational speed is equal to the viscosity of its corresponding Newtonian fluid.

The apparent viscosity of the yeast slurry is varied from 30000 cp to 1000 cp according to the variation in rotational speed from 2 rpm to 20 rpm, and therefore it can be seen that the yeast slurry is a non-Newtonian fluid.

It can also be found that the stirring torque of yeast slurry tends to become substantially constant regardless of the rotational speed as far as it is 10 rpm or less. This tendency is a feature found in Bingham fluid, and the data of FIG. 15 indicates that the yeast slurry is a Bingham fluid. The Bingham fluid is a fluid having a yield stress, so that the fluid is not moved even by the action of the force having a magnitude less than the yield stress.

It is presumable from the above fact that the yeast slurry is not a common fluid which can relatively easily be mixed, but a unique fluid which requires a special attention to be entirely fluidized and hence uniformly mixed.

The invention claimed is:

1. A stirring tank for storing a part of a beer yeast slurry discharged from fermentation tanks where beer is fermented, and then returning said part of the beer yeast slurry to the fermentation tanks for reuse, comprising:
   a tank body having a substantially cylindrical shape with a bottom portion having an inverted cone shape,
   a jacket disposed on a periphery of the tank body within which a cooling medium is circulated so as to cool the beer yeast slurry, and
   a stirring impeller made up of vertically oriented surfaces with no main stirring surface that is slanted from vertical, said stirring impeller having a shape and size configured to achieve vertical flow of the beer yeast slurry, and positioned within the tank body of the stirring tank, and having lower paddle blades each, including a lower side with a slanting surface to match the inverted cone shape of the bottom portion of the tank body, said stirring impeller being so constructed that the maximum diameter of a rotation body defined by the rotation of the stirring impeller is 60-90% of the inner diameter of the stirring tank, and the height of the rotation body is 70% or more of the depth of the beer yeast slurry stored in the stirring tank.

2. A stirring tank according to claim 1, wherein the maximum diameter of the rotation body defined by the rotation of the stirring impeller is 70-90% of the inner diameter of the stirring tank.

3. A stirring tank according to claim 2, wherein the height of the rotation body defined by the rotation of the stirring impeller is 90-120% of the depth of the beer yeast slurry.

4. A stirring tank according to claim 1, wherein the height of the rotation body defined by the rotation of the stirring impeller is 90-120% of the depth of the beer yeast slurry.

5. A stirring tank according to claim 1, wherein the stirring impeller has no hole or opening.

6. A stirring tank according to claim 1, wherein the stirring impeller includes a rotational shaft and upper paddle blades, wherein the lower paddle blades are affixed to the rotational shaft and extend from the rotational shaft in opposite directions from each other, wherein the upper paddle blades are affixed to the rotational shaft and extend from the rotational shaft in opposite directions from each other, and wherein the lower paddle blades extend from the rotational shaft at angles offset from the upper paddle blades.

7. A stirring tank according to claim 6, wherein portions of the upper paddle blades and portions of the lower paddle blades overlap each other in elevation.

\* \* \* \* \*